United States Patent
Ghribi

(10) Patent No.: US 11,661,884 B2
(45) Date of Patent: May 30, 2023

(54) LIQUID LUBRICANT JET WITH LIMITED FLOW RATE

(71) Applicant: SAFRAN AIRCRAFT ENGINES, Paris (FR)

(72) Inventor: Dhafer Ghribi, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 147 days.

(21) Appl. No.: 16/749,467

(22) Filed: Jan. 22, 2020

(65) Prior Publication Data

US 2020/0277889 A1   Sep. 3, 2020

(30) Foreign Application Priority Data

Jan. 23, 2019   (FR) ........................................ 1900574

(51) Int. Cl.
| | |
|---|---|
| *F01P 11/08* | (2006.01) |
| *F01D 25/20* | (2006.01) |
| *F01P 3/12* | (2006.01) |
| *F01D 25/18* | (2006.01) |

(52) U.S. Cl.
CPC .............. *F01P 11/08* (2013.01); *F01D 25/18* (2013.01); *F01D 25/20* (2013.01); *F01P 3/12* (2013.01); *F05D 2260/98* (2013.01)

(58) Field of Classification Search
CPC .......... F16N 7/32; F16N 7/34; F16N 2210/02; F01M 1/08; F01D 25/18; F01D 25/20; F01P 3/12; F01P 11/08; F05D 2260/607; F05D 2260/98; F05D 2220/323
See application file for complete search history.

(56) References Cited

U.S. PATENT DOCUMENTS

| | | | | |
|---|---|---|---|---|
| 4,525,995 A | * | 7/1985 | Clark | ...................... F01D 25/18 184/6.11 |
| 2014/0223917 A1 | * | 8/2014 | Gameiro | ................. F01D 25/18 60/772 |
| 2017/0138461 A1 | * | 5/2017 | Chory | ................. F16H 57/0435 |
| 2018/0371944 A1 | | 12/2018 | Bauduin et al. | |

FOREIGN PATENT DOCUMENTS

| | | |
|---|---|---|
| FR | 3 026 135 A1 | 3/2016 |
| FR | 3026135 A1 * | 3/2016 ............. F01D 25/16 |
| WO | WO 91/05943 A1 | 5/1991 |

OTHER PUBLICATIONS

Search Report as issued in French Patent Application No. 1900574, dated Nov. 13, 2019.

* cited by examiner

*Primary Examiner* — Loren C Edwards

(74) *Attorney, Agent, or Firm* — Pillsbury Winthrop Shaw Pittman LLP

(57) ABSTRACT

A jet for lubricating a piece of a turbomachine for an aircraft such as an airplane, including a circulation duct for flowing a pressurised fluid, includes a first duct chamber, a second duct chamber, a first nozzle for passing between the first duct chamber and the second duct chamber, the first nozzle having a fixed minimum passage cross-section, and a second nozzle for passing from the second chamber to the outlet port formed by the second nozzle, the second nozzle including a fixed minimum passage cross-section. The ratio of the cross-section of the first nozzle to the cross-section of the second nozzle is between 0.16 and 3.61.

10 Claims, 3 Drawing Sheets

LIQUID LUBRICANT JET WITH LIMITED FLOW RATE

CROSS REFERENCE TO RELATED APPLICATIONS

This application claims priority to French Patent Application No. 1900574, filed Jan. 23, 2019, the entire content of which is incorporated herein by reference in its entirety.

FIELD

The present invention relates to a jet for a liquid lubricant such as oil. In a known technique, a turbomachine comprises at least one oil circuit used to lubricate equipment such as rolling bearings, splines or gear teeth or to cool equipment such as electric generators. An oil circuit feeds one or more oil jets to lubricate the different mechanical elements.

BACKGROUND

To lubricate or even also cool pieces of the turbomachine, it is known to use a lubricant system comprising jets which enable oil to be sprayed on pieces to be lubricated such as meshing zones of a gear train. For this, the jets are connected to oil distribution channels and are arranged in the proximity of the pieces to be lubricated such as for example pinions so as to provide lubrification and cooling of the different pieces optimally. For example, the jets are oriented so as to radially spray an oil jet in order to reach the pinion teeth. The oil distribution channels draw oil through an oil pump of a lubricating group (GDL) from an oil tank.

The oil pump can be driven by an accessory gearbox (AGB) mechanically connected to an engine shaft, for example the shaft (called a HP shaft) of a high pressure spool, of the turbomachine. In this case, during the operation of the turbomachine, the flow rate provided by the oil pump (GDL) is proportional to the speed of the HP shaft of the turbomachine.

The turbomachine includes jets that can have different outlet port diameters as a function of the feed flow rate necessary for lubrication only, which varies depending on the pieces to be lubricated. The applicant was capable of determining that for most pieces to be lubricated by a jet, the liquid lubricant flow rate provided by the jet is generally between 2 litres per hour and a few tens litres per hour.

The liquid lubricant generally passes through a filter before reaching the jets, but the wear particles of the pieces (such as those generated by the pinion wear by friction) can have sizes lower than the dimensions of the filter meshes. These wear particles can thereby reach the outlet port of a jet which is used to spray the liquid lubricant. It is thus necessary to have a jet having at its outlet port, a minimum passage cross-section to avoid a port obstruction risk by these particles. The minimum passage cross-section can in particular for example correspond to that of a circular port with a diameter between 0.6 and 0.85 mm depending on the quality of the pieces lubricated by the liquid lubricant and the intensity of frictions between the same.

Thus, the jets for pieces needing the least amount of liquid lubricant comprise an outlet port having the abovementioned minimum cross-section.

During the operation of the turbomachine, the jets the outlet port of which has the minimum cross-section can be caused to provide a flow rate of 2 to 2.5 times the flow rate required to lubricate the relevant pieces.

This overfeeding of liquid lubricant can cause the allowed maximum threshold of the liquid lubricant volume building up in the zone of the pieces to be exceeded, and thus cause a churning of the liquid lubricant by the lubricated pieces, which generates a resisting torque causing on overheat of these pieces and the liquid.

SUMMARY

Therefore, there is a need to provide a solution enabling the liquid lubricant volume to be decreased in zones comprising pieces lubricated by jets having the minimum passage cross-section.

An aspect of the invention is in particular to provide a simple efficient solution to this problem.

According to an aspect of the invention, this need tends to be fulfilled by providing a lubricating jet for lubricating a piece of a turbomachine for an aircraft such as an airplane, comprising a circulation duct for flowing a pressurised fluid towards an outlet port of the jet, comprising:
- a first duct chamber,
- a second duct chamber,
- a first nozzle for passing between the first duct chamber and the second duct chamber, the first nozzle having a fixed minimum passage cross-section lower than a cross-section of the second duct chamber,
- a second nozzle for passing from the second chamber to the outlet port formed by the second nozzle, the second nozzle comprising a fixed minimum passage cross-section,
- wherein the first minimum cross-section and the second minimum cross-section each have a value such that a ratio of the minimum cross-section of the second nozzle to the minimum cross-section of the first nozzle is between 0.16 and 3.61.

In order to reduce the flow rate, the jet comprises two nozzles in series instead of a single one making it possible to have more head loss and thus to decrease the flow rate without having a nozzle below the minimum passage cross-section threshold. The double throttle effect in series of both nozzles makes it possible to have a first head loss which decreases pressure between the first and the second chamber thus making it possible to have less pressure difference between the second chamber having a reduced pressure and the zone of the pieces to be lubricated. Both nozzles thus enable the liquid lubricant flow rate to be decreased. Thus, the jets lubricating the pieces needing less oil volume can supply less liquid lubricant than in prior art by having at least one nozzle having the minimum passage cross-section and another nozzle having from 1 to 3.61 times the minimum cross-section. Beyond 3.61 times the minimum passage cross-section, it has been realised that the throttle effect did no longer act on the flow rate decrease satisfactorily.

By minimum passage cross-section, it is meant the smallest cross-section allowing passage of wear particles of the pieces depending on the quality of the pieces and the frictions between the same which are lubricated by the liquid lubricant. The minimum passage cross-section can be upstream of the outlet port, that is at the first nozzle or can be at the second nozzle having the outlet port.

By minimum cross-section of the nozzle, it is meant the smallest cross-section of the nozzle. For example, the minimum cross-section of the second nozzle can be upstream of the outlet port, in particular when the second nozzle flares outwardly.

Thus, during a high speed of the engine, the liquid lubricant flow rate by the jet is reduced with respect to a prior art jet having a single nozzle forming the outlet port.

When the propelling engine rotates at a low speed, for example at idle, the liquid lubricant flow rate provided by the jet is less impacted than at a high speed because of a less significant pressure drop in the jet. Thus, when the engine is at a low speed, the liquid flow rate is sufficient and when the engine is at the high speed, the flow rate does not exceed a maximum overfeeding threshold for the liquid lubricant, thus decreasing the oil churning risk and thus the machine overheat risk.

The device according to one or more embodiments the invention can also have one or more of the characteristics below, considered individually or according to any technically possible combinations:

In one embodiment, the second duct chamber comprises a portion adjacent to the first nozzle having a circular cross-section.

In an embodiment, the second duct chamber comprises a portion adjacent to the first nozzle having a larger cross-section than the largest cross-section of the first nozzle. Thus, the nozzle forms a throttle.

According to one example of both preceding embodiments, the maximum diameter of the first nozzle is lower than the diameter of the portion of the second duct chamber adjacent to the first nozzle. In one example, the second duct chamber has a fixed cylindrical cross-section.

In an embodiment, the first adjacent chamber comprises a portion adjacent to the first nozzle having a lower cross-section than a cross-section of a portion of the second chamber adjacent to the first nozzle.

According to an example of this embodiment, the second duct chamber and the first duct chamber are circular, and each comprise a fixed diameter such that the fixed diameter of the second chamber is higher than the fixed diameter of the first chamber.

In an embodiment, the first duct chamber is open to the second duct chamber through the first nozzle.

In other words, the liquid lubricant passes from the first chamber to the second chamber through the first nozzle without the latter containing a filter or membrane or strainer partially or fully closing the first nozzle.

In an embodiment, the circulation duct comprises a fixed continuous volume from the first chamber to the outlet port of the second nozzle.

By fixed continuous volume, it is meant that there is no filter, membrane, trainer or valve. Thus, there is no fouling or clogging risk for the duct for example by a filter or a strainer and does not either include a membrane or valve in these chambers that can have a consequence at a low speed of the turbomachine.

In an embodiment, the first nozzle and/or the second nozzle have a minimum passage cross-section having a diameter between 0.60 mm and 0.85 mm, for example equal to 0.72 mm. This dimension makes it possible to have a minimum passage duct cross-section large enough to prevent pollutants (particles) in the liquid lubricant oil from plugging the nozzle.

In an embodiment, the second nozzle of the jet comprises a minimum cross-section corresponding to that of a circular port with a diameter between 0.70 mm and 0.75 mm, for example equal to 0.72 mm, and the diameter of the first nozzle comprises a minimum cross-section also corresponding to that of a circular port having a diameter between 0.7 mm and 0.75 mm. It is understood that the shape of the port formed by a nozzle of the jet can be other than circular, for example ellipsoidal.

In an embodiment, the first nozzle has the smallest passage cross-section of both nozzles, which enables the size of the second nozzle to be calibrated with a sufficient diameter in order to decrease the outlet speed of the liquid lubricant if it is desired to avoid too strong a jet onto the zone to be lubricated.

In one alternative of the latter embodiment, the second nozzle has the smallest passage cross-section of both nozzles. This makes it possible to have the most significant head loss at the jet outlet in order to propel the liquid lubricant as fast as possible, which is an interesting in particular if the jet is relatively distant from the zone to be lubricated.

In an embodiment, the first nozzle has an abrupt contraction and flares divergently towards the second chamber. Using an abrupt contraction followed by a divergent widening enables lubricant dispersion to be promoted into the second chamber.

In an embodiment, the second nozzle is convergent and extends from a side surface, for example a radial surface.

In one alternative of the latter embodiment, the second nozzle is cylindrical.

According to one example of one of both latter embodiments, the jet comprises an outlet side wall through which the second nozzle passes and the outlet side wall is conical flaring from the second nozzle to a circumferential inner wall surrounding the second chamber.

The circumferential wall is according to one example, a cylindrical wall comprising a cylindrical surface delimiting the second chamber.

In an embodiment, the minimum passage cross-section of the first nozzle is cylindrical comprising a first minimum diameter and the minimum cross-section of the second nozzle is cylindrical comprising a second minimum diameter, and the first minimum diameter and the second minimum diameter each have a value such that a ratio of minimum diameters equal to the minimum diameter of the second nozzle to the minimum diameter of the first nozzle is between 0.4 and 1.9.

According to one example, the ratio of minimum diameters is between 0.8 and 1.2.

According to one example, the first nozzle is cylindrical.

According to one example, the second nozzle is cylindrical.

In an embodiment, the jet comprises:
a first body comprising the first chamber and the first nozzle,
a second body comprising the second chamber and the second nozzle, this second body being mounted to the first body, and
a seal located between the second body and the first body.

Thus, the jet is simple to be made, and is sealed.

According to one alternative to the preceding embodiment, the jet comprises
a first body comprising the first chamber,
a second body comprising the second chamber, the first nozzle and the second nozzle, and
a seal located between the second body and the first body mounted to the second body.

In this embodiment, the first nozzle is beneficially cylindrical to facilitate manufacture.

In an embodiment, the jet comprises an inlet port adapted to be connected to a hydraulic piping of a lubricant circuit and in which the inlet port opens into the first chamber.

In an embodiment, the first chamber and the second chamber each comprise only one liquid inlet and one liquid outlet and the first nozzle forms the outlet of the first chamber and the inlet of the second chamber, the second nozzle forms the outlet of the second chamber, the first chamber comprises an inlet to be connected to a hydraulic piping of liquid lubricant.

According to an alternative to the latter embodiment, the jet comprises a third nozzle upstream of the first nozzle, the third nozzle comprising a minimum cross-section having a value between 1 and 1.9 times the cross-section of the second nozzle.

An aspect of the invention is also aimed at an assembly comprising a gear train and a previously described jet with or without the different described embodiments comprising its outlet port oriented to the gear train.

Another aspect of the invention relates to an accessory gearbox comprising the previously described assembly and wherein the box comprises:
- a movement inlet for being mechanically connected to a high pressure shaft,
- a pump outlet mechanically connected to the gear train and adapted to be mechanically connected to a lubricant pump to pump a lubricating liquid,
- a jet inlet connected to the jet and adapted to be connected to the hydraulic pump to transmit the liquid lubricant pumped by the pump to the jet.

Finally, an aspect of the invention also relates to a twin-spool turbomachine for an aircraft, comprising:
- a gas generator comprising a high pressure spool which comprises a high pressure shaft,
- an accessory gearbox comprising a movement inlet mechanically connected to the high pressure shaft,
- a lubricating group comprising a lubricant pump driven by the accessory gearbox such that the flow rate of the lubricant pump is proportional to the rotational speed of the high pressure shaft, the lubricant pump feeding a previously described jet with or without the different previously described embodiments,
- a gear train located in the accessory gearbox or outside the same, and lubricated at least partly by the jet,
- wherein the flow rate of lubricating liquid provided by the pump to the jet is between 2 litres per hour and 30 litres per hour.

In one example of this embodiment, the turbomachine is adapted, when its high pressure shaft rotates at a low speed, to produce a mechanical power to the hydraulic pump to transmit a lubricating liquid flow rate to the jet of a value between 2 litres and 7 litres per hour and at the high speed between 15 litres per hour and 30 litres per hour.

In one example of this embodiment, the movement inlet is mechanically connected to a radial shaft connected to the high pressure shaft through a transmission shaft and a gear.

In an embodiment of the turbomachine, the turbomachine further comprises other jets such as that previously described and further comprising at least one jet only comprising a single outlet nozzle for example facing a gear.

BRIEF DESCRIPTION OF THE FIGURES

Further characteristics and benefits of the invention will clearly appear from the description thereof given below, by way of indicating and in no way limiting purposes, in reference to the appended figures, in which.

For the sake of clarity, identical or similar elements are marked with identical reference signs throughout the figures.

DETAILED DESCRIPTION

Figure 1:
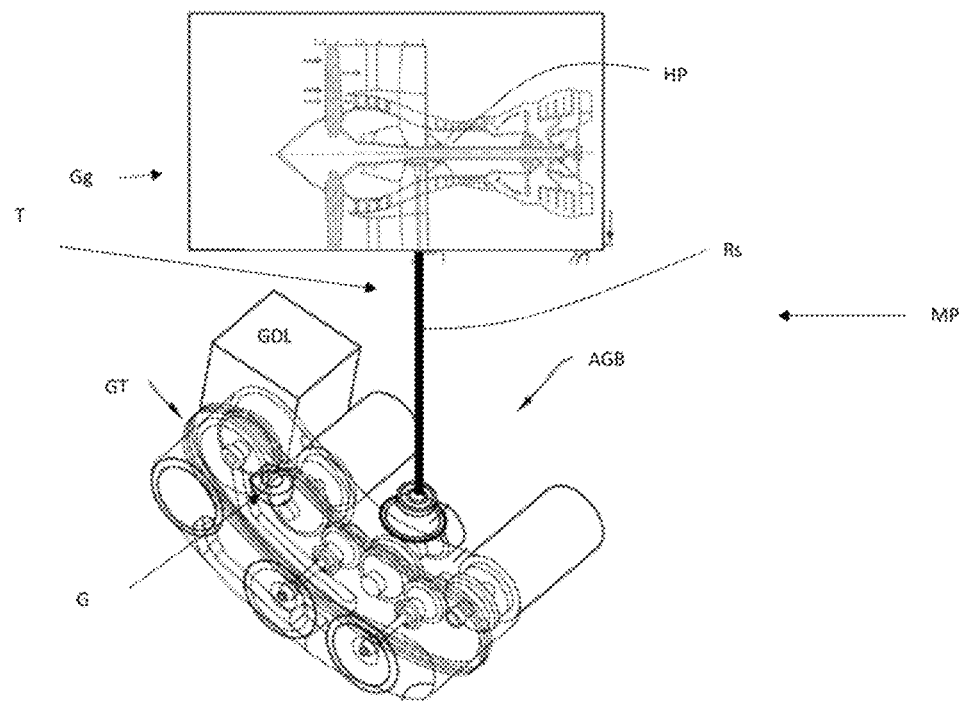
FIG. 1 represents a three-dimensional view of an accessory gearbox comprising its two transparent cases with accessories mounted to the accessory gearbox and an axial cross-section view of a gas generator with a fan.

FIG. 1 schematically represents a three-dimensional view of an accessory gearbox AGB which can be installed for example in a nacelle of a twin-spool turbomachine MP, and an axial cross-section view of a gas generator Gg with a fan of the turbomachine MP schematically represented in a rectangle.

The gas generator Gg comprises a high pressure spool comprising a high pressure shaft HP. The gas generator Gg and the fan are for example those of a turbofan.

The accessory gearbox AGB comprises a gear train GT connected through a transmission shaft train T to the high pressure shaft HP of the gas generator Gg.

The transmission shaft train T herein comprises a radial shaft RS directly connected to the high pressure shaft HP.

The gear train GT of the accessory gearbox AGB comprises a plurality of pinions or ring gears meshed with each other in the accessory gearbox AGB. Accessories are mounted to inlets or outlets of the case of the accessory gearbox. By inlet, it is meant that the mechanical energy comes from an accessory and is transmitted to the gear train GT and by outlet, it is meant that the mechanical energy is transmitted to the accessory. Each of these inlets or outlets are directly formed from a shaft comprising either one of the pinions or one of the ring gears of the gear train GT.

For example, one of the accessories is an oil pump of a lubricating group GDL comprising at least one hydraulic outlet to propel a liquid lubricant into a hydraulic circuit and an hydraulic inlet to suck the liquid lubricant through a hydraulic circuit in at least one liquid lubricant tank of the turbomachine MP.

The lubricating group GDL is schematically represented by a rectangle. In this example, the lubricating group GDL comprises a plurality of scavenge pumps (not represented) to suck the liquid lubricant from the different tanks of the turbomachine and an oil circulation pump propelling the liquid lubricant scavenged by the scavenge pumps into the hydraulic circuit.

The hydraulic circuit comprises a plurality of jets G for spraying liquid lubricant onto different pieces to be lubricated of the turbomachine, including the accessory gearbox AGB.

Figure 2:
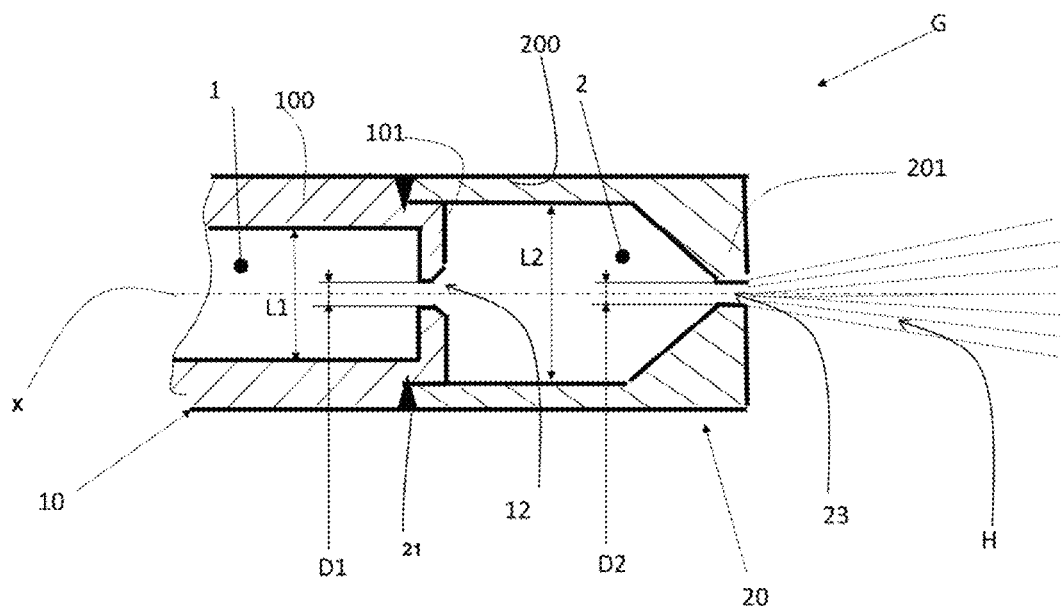
FIG. 2 represents an axial cross-section view of an example of a first embodiment of a jet comprising two nozzles according to the invention.

FIG. 2 represents a cross-section view of one end of one of the jets G according to one embodiment of the invention of the turbomachine.

The jet G comprises a first duct chamber 1, a second duct chamber 2, a first nozzle 12 for passing between the first chamber 1 and the second chamber 2 to circulate the liquid lubricant, herein oil H from the first chamber 1 to the second chamber 2 and a second nozzle 23 for passing from the second chamber to an outlet port formed by the second nozzle to spray the liquid lubricant onto the piece to be lubricated.

The first nozzle 12 has a fixed minimum passage cross-section between the first duct chamber 1 and the second duct chamber 2. The second nozzle 23 has a fixed minimum passage cross-section. In this exemplary embodiment, the fixed minimum passage cross-section of the second nozzle 23 forms the outlet port. By fixed minimum passage cross-section, it is meant the smallest passage cross-section of the nozzle.

According to another example not represented, the passage of the second nozzle comprises a part flaring outwardly by thus having a cross-section which becomes larger towards the outlet port. The fixed minimum passage cross-section is in this case between the second chamber and the flaring passage of the second nozzle.

In this example, the first chamber 1 is open to the second chamber 2 by the first nozzle 12. In this case, the circulation circuit comprises a fixed continuous volume, from the first chamber 1 of the duct to the outlet port of the second nozzle 2. In other words, from the first chamber 1 to the outlet port 23, the circulation duct is devoid of a member modifying the volume by sealingly separating the first chamber at the outlet port.

In the embodiment represented in FIG. 2, the jet G comprises a first body 10 located upstream of the jet and a second downstream body 20 located downstream of the jet.

The first body 10 comprises a circumferential wall, having, in this example, the shape of a cylinder with an axis X and is called in the following text a cylindrical wall 100. The first body 10 further comprises an intermediate side wall which is, in this example, a radial wall 101 extending radially from an inner surface of the cylindrical wall closing an end of the cylindrical wall 100 and a second side wall not represented closing the other end of the cylindrical wall 100. The second side wall can also be for example radial or conical.

According to another example, the circumferential wall comprises another shape, for example rectangular. According to yet another example not represented, a third body is mounted to the jet G forming the second side wall.

The first chamber 1 is thus formed in the first body 10. The first chamber 1 in this example has thus a cylindrical shape formed by the inner surface of the cylindrical wall 100 and both side surfaces of the side walls. The first chamber 1 comprises a cross-section having a diameter L1. In this example, the diameter L1 corresponds to a portion of the first chamber 1 adjacent to the first nozzle 12.

The chamber 1 comprises an inlet port not represented that can either be an axial opening on the second side wall not represented, or a radial opening on the cylindrical wall 100. The first radial wall 101 further comprises the first nozzle 12 for passing liquid lubricant from the first chamber 1 to the second chamber 2. The first nozzle 12 thus forms an axial opening between both chambers.

The jet G comprises in this example a second body 20 comprising a cylindrical wall 200 with an axis X and centred on an outer shoulder of the cylindrical wall 100 of the first body 10. The second body 20 further comprises an outlet side wall 201 comprises a cone-shaped portion having an inner conical surface extending from the inner surface of the cylindrical wall 20 to the second nozzle 23. The second nozzle 23 is thus made in this outlet side wall 201 forming an opening axially passing through this outlet side wall 201. The outer surface of the outlet side wall 201 is herein radial.

The second chamber 2 is thus formed in the second body 20 and the intermediate wall 101 of the first body 10. More precisely, in this example, the second chamber 2 is delimited by a radial surface of the intermediate side wall 101, by the inner, herein cylindrical, surface of the cylindrical wall 200 and by the outlet side wall 201. The second chamber 2, in this example, has thus a cylindrical shaped portion formed by the inner surface of the cylindrical wall 200 and a radial surface of the intermediate wall 101 and further a conical portion formed by the conical surface of the outlet side wall 201. The second chamber 2 comprises a cross-section having a diameter L2. Herein, the diameter L2 is the diameter of the portion of the second chamber 2 adjacent to the first nozzle 12. Herein, the second chamber 2 has a fixed diameter L2.

The cross-section with a diameter L1 of the portion of the first chamber 1 adjacent to the first nozzle 12 is lower than the cross-section with a diameter L2 of the portion of the second chamber 2 adjacent to the first nozzle 12. In other words, the diameter L1 is lower than diameter L2.

The jet G further comprises a seal 21 between the first body 10 and the second body 20. Herein, in this exemplary embodiment, the seal 21 is mounted about a surface of the shoulder and is compressed between a radial surface of the shoulder of the cylindrical wall 100 of the first body 10 and a conical surface forming the end of the cylindrical wall 200 of the second body 20.

According to the example represented, the seal 21 is flat and is crushed by the conical surface of the second body 20. According to another example not represented, the cylindrical wall 200 comprises a radial end in contact against the seal 21.

According to another example not represented of this embodiment, the seal is for example an O-ring mounted in a groove of the cylindrical wall 100, 200 of one of both bodies 10, 20 and is compressed by the cylindrical surface of the other cylindrical wall 200, 100.

The liquid lubricant H can thus circulate from the first chamber 1 to outside the jet by passing through the first nozzle 12 and then through the second chamber 2 and finally through the second nozzle 23.

The hydraulic pump of the lubricating group GDL transfers the liquid lubricant into the hydraulic duct which arrives in the first chamber 10 at a first pressure P1 and is then at a second pressure P2 in the second chamber 20. The second pressure P2 is lower than the first pressure P1 because of a head loss by the first nozzle 12. The second pressure P2 is thus equal to the first pressure P1 minus the head loss. The liquid lubricant H is sprayed onto the piece in a zone 3 because of the flow rate of the liquid lubricant H and the pressure difference between the second pressure P2 and an ambient pressure P3 in the zone of the lubricated piece. The propulsion of the liquid lubricant H is schematically represented by dashed lines in FIG. 2.

The liquid lubricant H circulates in the first chamber, the first nozzle, the second chamber and the second nozzle in a continuous volume, that is without filter or membrane or check valve etc.

In this example, the first nozzle 12 has an abrupt contraction and flares divergently towards the second chamber 2. Herein, the first nozzle 12 comprises a cylindrical portion extending from the first chamber 1 and a conical portion extending from the cylindrical portion flaring towards the second chamber 2. The minimum cross-section of the first nozzle 12 is thus in the cylindrical portion comprising a first minimum diameter D1, that is a minimum cross-section equal to $\pi(D1)^2/4$. The head loss at this first nozzle is mainly related to this minimum cross-section in particular because of the abrupt contraction and is thus mainly a function of the first minimum diameter D1.

The first nozzle 12 has a fixed minimum passage cross-section lower than a cross-section of the second duct chamber 2. The diameter L2 of the second chamber 2 is thus greater than the diameter D1.

Herein, the diameter L2 of the second chamber 2 is greater than any diameter of the first nozzle 12.

Further in this example, the outlet side wall 201 is convergent, enabling the head losses to be somewhat decreased in the second, herein cylindrical shaped, nozzle 23 and comprising a second minimum diameter D2. By second minimum diameter D2, it is meant the smallest passage cross-section diameter of the second nozzle. The second nozzle 23 thus has a constant cross-section equal to $\pi(D2)^2/4$.

The pressure P3 of the zone of the piece to be sprayed with liquid lubricant can be the atmospheric pressure which can in particular vary as a function of the airplane altitude. For example, the pressure P3 is 1 bar.

In this embodiment, the first minimum diameter D1 is equal to the second minimum diameter D2+ or −0.01 mm and is herein equal to 0.72 mm.

In this embodiment, the 0.72 mm diameter value is the minimum diameter of the circulation duct corresponding to a minimum passage cross-section.

The different frictions of the pieces with each other of the turbomachine form particles of the different pieces which are mixed with oil. These particles pollute oil. The liquid lubricant thus comprises oil mixed with solid particles upon using the turbomachine. Having a diameter which is not lower than 0.72 mm enables the liquid lubricant to pass through both nozzles of the jet G without clogging them.

In other embodiments of another turbomachine, the minimum passage diameter of the nozzle of the jet can have another value than 0.72 but will correspond to the smallest diameter of the jets tips of the different jets.

According to another embodiment, the jet of the invention comprises a first minimum diameter D1 different from the second minimum diameter D2.

For example, the first minimum diameter D1 of the first nozzle 12 is equal to 0.72 mm and the second minimum diameter D2 of the second nozzle 23 has a value between 0.73 and 1.4 mm, for example 1 mm. According to another example, the second minimum diameter D2 of the second nozzle 23 is equal to 0.72 mm and the first minimum diameter D1 of the first nozzle 23 has a value between 0.73 and 1.4 mm, for example 1 mm.

Figure 3:
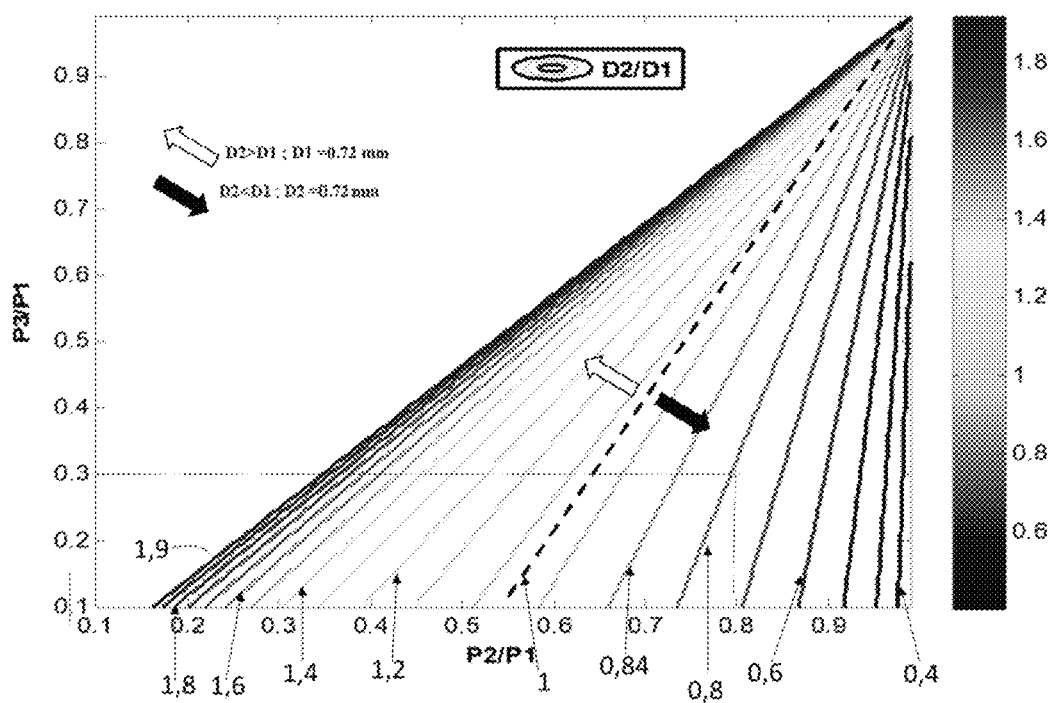
FIG. 3 represents a graph representing several straight lines at different pressure ratios as a function of different cross-section ratios between both nozzles.

FIG. 3 graphically represents straight lines in a Cartesian coordinate system having in ordinate an overall ratio P3/P1 equal to the ambient pressure P3 in the zone of the piece to be lubricated to the pressure P1 in a first chamber 1 of an exemplary jet according to this first embodiment and in abscissa an intermediate ratio P2/P1 equal to the pressure P2 in a second chamber to the pressure P1 in a first chamber of an exemplary jet according to this first embodiment.

Each of the straight lines represents a ratio of minimum diameters D2/D1 of an exemplary of a jet according to this first embodiment having a first nozzle 12 having a minimum cylindrical cross-section having a minimum diameter D1 and having a second nozzle 23 having a minimum cylindrical cross-section having a minimum diameter D2. The ratio of minimum diameters D2/D1 is equal to the value of the minimum diameter D2 of the minimum passage cross-section of the second nozzle 23 to the minimum diameter D1 of the minimum passage cross-section of the first nozzle 12. The straight lines of the different examples are different from each other, by varying either of both diameters D1 and D2 whereas either of both diameters D1, D2 remains equal to 0.72 mm. Some of these straight lines are pointed by arrows at the bottom of the graph indicating the corresponding ratio values. It can be seen that the value of the ratio D2/D1 of the diameters of both nozzles ranges from 1.9 on the left to 0.4 on the right. One of the arrows has the value of 1, points out on a dotted straight line representing the previously described embodiment, that is the case where the first minimum diameter D1 of the first nozzle 12 and the second minimum diameter D2 of the second nozzle are equal and each have a value equal to 0.72 mm.

In each of these straight lines, either the first minimum diameter D1 is equal to 0.72 mm (representing the minimum diameter value with a minimum passage cross-section in this example) or the second minimum diameter D2 is equal to 0.72 mm.

The white arrow in the graph shows that the more the straight lines are to the left of the dotted straight line=1, the larger the second minimum diameter D2 of the second nozzle whereas the first minimum diameter D1 has a value equal to the value of 0.72 mm, and the black arrow on the graph shows that the more the straight lines are to the left of the dotted straight line=1, the larger the first minimum diameter D1 of the first nozzle whereas the second minimum diameter D2 has a value equal to 0.72 mm.

Figure 4:
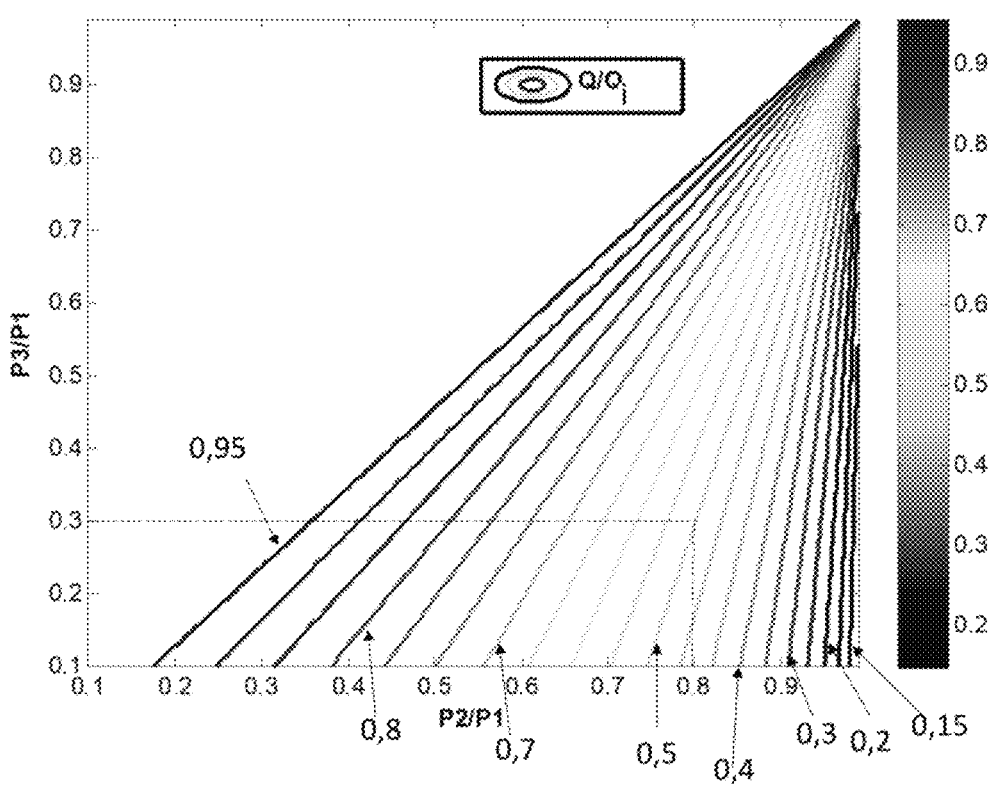
FIG. 4 represents a graph representing several straight lines at different pressure ratios as a function of the flow rate.

FIG. 4 graphically represents straight lines in a Cartesian coordinate system having in ordinate the overall ratio P3/P1 and in abscissa the intermediate ratio P2/P1 as in the graph of FIG. 3.

In this graph, each of the straight lines represents a reduced flow rate ratio Q/Qi which is equal to the flow rate Q obtained by a jet having two nozzles, at least one of both having a diameter equal to the minimum passage value equal to 0.72 mm in this example, to the flow rate Qi representing the flow rate of a prior art jet having a single chamber and thus a single nozzle, the latter being chosen having a diameter value equal to 0.72 mm.

Some of the straight lines have a reduced flow rate ratio value, by being pointed out by arrows at the bottom of the graph. It can be seen that the reduced flow rate ratio value Q/Qi ranges from 0.15 on the right to 0.95 on the left.

In each of these straight lines, either the first minimum diameter D1 is equal to 0.72 mm (representing the minimum passage diameter value in this example) or the second minimum diameter D2 is equal to 0.72 mm or both diameters are equal to 0.72 mm.

It can be seen on this straight line that the invention can enable the flow rate to be decreased with respect to a flow rate of a jet with a single nozzle having a minimum passage cross-section, in particular for example a flow rate reduced by 20% with respect to the flow rate corresponding to the straight line pointed out by the value 0.2 can be seen.

The flow rate of a nozzle is proportional to the minimum diameter of the minimum cross-section multiplied by the root of the difference between the pressure in the upstream chamber and the pressure in the downstream chamber.

$$D*\sqrt{P_{upstream}-P_{downstream}} \quad \text{[Math. 1]}$$

For example, for the first nozzle 12, the flow rate is proportional to the first minimum diameter D1 multiplied by the root of the difference between the pressure P1 in the first chamber 1 and the pressure P2 in the second chamber 2.

$$D2*\sqrt{P_1-P_2} \quad \text{[Math. 2]}$$

These different curves thus show that a jet according to the invention can have a flow rate equal to 0.2 to 0.9 times the flow rate of a jet having a nozzle having the same minimum cross-section.

Thus, referring to the graph of the figure, in the case where it is desired to decrease a flow rate about twice too significant than a prior art jet having a nozzle having a minimum cross-section having a diameter of 0.72 mm, with a jet according to this exemplary embodiment for an overall pressure ratio P3/P1, for example of 0.3, the pressure ratio P2/P1 is equal to 0.8 to decrease the flow rate by half, see the dotted lines in FIG. 4.

Thus, referring to FIG. 3, with a jet G according to this exemplary embodiment, for an overall pressure ratio P3/P1, equal to 0.3 and a pressure ratio P2/P1 equal to 0.8, the second minimum diameter D2 of the minimum cross-section of the second nozzle 23 will be 0.72 mm and the first minimum diameter D1 of the minimum cross-section of the first nozzle is approximately equal 0.9 mm, represented by the straight line having a ratio D2/D1 equal to 0.8.

The minimum passage cross-section value of the first nozzle 12 of this exemplary of jet is thus equal to 0.2025 square millimetre and the minimum cross-section value of the second nozzle is equal to 0.1296 square millimetre, that is a minimum cross-section ratio equal to 0.64.

Finally, it can therefore be seen in these graphs that the more significant the pressure difference between the pressure P1 in the first chamber and the pressure P3 at the outlet of the jet, the more the different straight lines move away from each other and the smaller this pressure difference, the more the straight lines move closer to each other. Thus, the more the pump provides a pressure to the jet, the more the jet of the invention decreases the flow rate with respect to the flow rate of the jet having a single nozzle with a minimum passage diameter and the least the pump provides a pressure to the jet, the more the jet of the invention gets closer to the flow rate of the jet having only a single nozzle with a minimum passage diameter. This makes it possible, in case of a low pressure, for example when the engine of the turbo machine rotates at idle, to have a sufficient liquid lubricant flow rate.

According to one alternative of these exemplary embodiments, the first minimum diameter D1 of the first nozzle 12 and the second minimum diameter D2 of the second nozzle 23 each have a higher value than the value 072 mm for a minimum diameter ratio D2/D1 equal to the minimum diameter of the second nozzle 23 to the minimum diameter of the first nozzle 12 to be between 0.4 and 1.9. Thus, this makes it possible to reduce the flow rate with respect to an initial flow rate of a prior art jet while having greater diameters to decrease the risk of particles preventing the liquid lubricant from flowing out from the jet G.

It will be appreciated that the invention is not limited to the embodiments described in reference to the figures and alternatives could be contemplated without departing from the scope of the invention.

The invention claimed is:

1. A lubricating jet for lubricating a piece of a turbomachine for an aircraft, comprising a circulation duct for flowing a pressurized fluid up to an outlet port of the jet, comprising:
    a first duct chamber,
    a second duct chamber,
    a first nozzle for the pressurized fluid passing between the first duct chamber and the second duct chamber, the first nozzle having a first fixed minimum passage cross-section lower than a cross-section of the second duct chamber,
    a second nozzle for the pressurized fluid passing from the second chamber to the outlet port formed by the second nozzle, the second nozzle comprising a second fixed minimum passage cross-section,
    wherein the first chamber and the second chamber each comprise only one liquid inlet and one liquid outlet and the first nozzle forms the outlet of the first chamber and the inlet of the second chamber, the second nozzle forms the outlet of the second chamber, the liquid inlet of the first chamber to be connected to a hydraulic piping of liquid lubricant, and
    wherein the first fixed minimum passage cross-section and the second fixed minimum passage cross-section each have a value such that a ratio of the second fixed minimum passage cross-section of the second nozzle to the first fixed minimum passage cross-section of the first nozzle is between 0.16 and 3.61.

2. The lubricating jet according to claim 1, wherein the first duct chamber is open to the second duct chamber through the first nozzle.

3. The lubricating jet according to claim 1, wherein the circulation duct comprises a fixed continuous volume from the first duct chamber to the outlet port of the second nozzle.

4. The lubricating jet according to claim 1,
    wherein at least the first fixed minimum passage cross-section and/or the second fixed minimum passage cross-section have a diameter between 0.60 mm and 0.85 mm.

5. The lubricating jet according to claim 1, wherein the first fixed minimum passage cross-section of the first nozzle is cylindrical comprising a first minimum diameter and the second fixed minimum passage cross-section of the second nozzle is cylindrical comprising a second minimum diameter and the first minimum diameter and the second minimum diameter each have a value such that a minimum diameters ratio that is equal to a ratio of the minimum diameter of the second nozzle to the minimum diameter of the first nozzle is between 0.4 and 1.9.

6. The lubricating jet according to claim 1,
    wherein the first fixed minimum passage cross-section of the first nozzle is cylindrical comprising a first minimum diameter and the second fixed minimum passage cross-section of the second nozzle is cylindrical comprising a second minimum diameter and the first minimum diameter and the second minimum diameter each have a value such that a minimum diameters ratio that is equal to a ratio of the minimum diameter of the second nozzle to the minimum diameter of the first nozzle is between 0.8 and 1.2.

7. The lubricating jet according to claim 1, wherein the first nozzle is divergent and the second nozzle is convergent.

8. The lubricating jet according to claim 1, wherein the aircraft is an airplane.

9. A twin-spool turbomachine for an aircraft, comprising:
    a gas generator comprising a high pressure spool which comprises a high pressure shaft,
    an accessory gearbox comprising a movement inlet mechanically connected to the high pressure shaft,
    a lubricating group comprising a lubricant pump driven by the accessory gearbox such that a flow rate of the lubricant pump is proportional to a rotational speed of the high pressure shaft, the lubricant pump feeding a lubricating jet according to claim 1,
    a gear train located in the accessory gearbox or outside the accessory gearbox, and lubricated at least partly by the jet, wherein a flow rate of lubricating liquid provided by the pump to the jet is between 2 litres per hour and 30 litres per hour.

10. A lubricating jet for lubricating a piece of a turbomachine for an aircraft, comprising a circulation duct for flowing a pressurized fluid up to an outlet port of the jet, comprising:
- a first duct chamber,
- a second duct chamber,
- a first nozzle for the pressurized fluid passing between the first duct chamber and the second duct chamber, the first nozzle having a first fixed minimum passage cross-section lower than a cross-section of the second duct chamber,
- a second nozzle for the pressurized fluid passing from the second chamber to the outlet port formed by the second nozzle, the second nozzle comprising a second fixed minimum passage cross-section,
- a first body comprising the first duct chamber and the first nozzle,
- a second body comprising the second duct chamber and the second nozzle, the second body being mounted to the first body,
- a seal located between the second body and the first body,
- wherein the first fixed minimum passage cross-section and the second fixed minimum passage cross-section each have a value such that a ratio of the second fixed minimum passage cross-section of the second nozzle to the first fixed minimum passage cross-section of the first nozzle is between 0.16 and 3.61.

* * * * *